US008103239B2

(12) United States Patent
Yamazaki et al.

(10) Patent No.: US 8,103,239 B2
(45) Date of Patent: Jan. 24, 2012

(54) EMERGENCY NOTIFICATION SYSTEM AND EMERGENCY NOTIFICATION DEVICE

(75) Inventors: Junichi Yamazaki, Tokyo (JP); Masaaki Kawabata, Tokyo (JP)

(73) Assignee: NEC Corporation, Tokyo (JP)

( * ) Notice: Subject to any disclaimer, the term of this patent is extended or adjusted under 35 U.S.C. 154(b) by 573 days.

(21) Appl. No.: 11/352,545

(22) Filed: Feb. 10, 2006

(65) Prior Publication Data

US 2006/0128356 A1 Jun. 15, 2006

Related U.S. Application Data

(63) Continuation of application No. 10/238,628, filed on Sep. 11, 2002, now Pat. No. 7,308,246.

(30) Foreign Application Priority Data

Sep. 12, 2001 (JP) ................................ 2001-275876

(51) Int. Cl.
*H04M 11/04* (2006.01)
*H04M 3/43* (2006.01)
*H04W 24/00* (2009.01)

(52) U.S. Cl. .................. 455/404.1; 455/414.2; 455/440; 455/456.1; 455/456.3; 455/457

(58) Field of Classification Search ............... 455/404.1, 455/404, 517, 456.1, 567, 521, 440, 415, 455/414.2, 456.3; 379/58; 345/1.1, 1.2; 370/351; 340/990, 573.1, 539.13
See application file for complete search history.

(56) References Cited

U.S. PATENT DOCUMENTS 4,962,473 A 10/1990 Crain
5,109,399 A 4/1992 Thompson
5,179,374 A * 1/1993 Winger ......................... 455/440
5,339,351 A 8/1994 Hoskinson et al.
5,365,570 A 11/1994 Boubelik
5,399,351 A 3/1995 Leshchiner et al.
5,515,419 A * 5/1996 Sheffer ...................... 455/456.5
5,740,532 A 4/1998 Fernandez et al.
5,742,666 A 4/1998 Alpert
5,867,110 A 2/1999 Naito et al.
5,937,355 A 8/1999 Joong et al.
6,047,198 A 4/2000 Sudo
6,067,017 A 5/2000 Stewart et al.
6,198,914 B1 * 3/2001 Saegusa ..................... 455/404.2
6,226,510 B1 5/2001 Boling et al.
6,397,054 B1 5/2002 Hoirup et al.
6,564,063 B1 5/2003 Mittelstadt
6,614,394 B2 9/2003 Honda et al.
6,636,732 B1 10/2003 Boling et al.
(Continued)

FOREIGN PATENT DOCUMENTS

JP 9-54895 2/1997
(Continued)

*Primary Examiner* — Kiet Doan
(74) *Attorney, Agent, or Firm* — Foley & Lardner LLP

(57) ABSTRACT

An emergency notification uses a normal cellular telephone terminal instead of a dedicated terminal without requiring communication using a voice. An emergency notification system has a mobile communication network including a cellular telephone terminal, an emergency notification device for receiving an emergency notification, a communication line connecting the mobile communication network and the emergency notification device, and the cellular telephone terminal including display means for displaying a menu for identifying kind of emergency notification on a display screen and means for performing the emergency notification in response to selection of one of items in the menu by a user.

19 Claims, 5 Drawing Sheets

U.S. PATENT DOCUMENTS

| | | | | |
|---|---|---|---|---|
| 6,647,267 | B1 | 11/2003 | Britt et al. | |
| 6,671,508 | B1 | 12/2003 | Mitsuoka et al. | |
| 6,697,630 | B1 | 2/2004 | Corwith | |
| 6,748,051 | B1 | 6/2004 | Staub | |
| 6,748,223 | B2 * | 6/2004 | Fraccaroli | 455/456.1 |
| 6,912,399 | B2 | 6/2005 | Zirul et al. | |
| 2001/0013020 | A1 | 8/2001 | Yoshida et al. | |
| 2001/0051514 | A1 * | 12/2001 | Lindholm | 455/404 |
| 2002/0012323 | A1 | 1/2002 | Petite et al. | |
| 2002/0034960 | A1 * | 3/2002 | Muranaga | 455/517 |
| 2002/0075844 | A1 * | 6/2002 | Hagen | 370/351 |
| 2002/0076003 | A1 | 6/2002 | Zellner et al. | |
| 2002/0101961 | A1 | 8/2002 | Karnik et al. | |
| 2002/0165013 | A1 * | 11/2002 | Bright et al. | 455/567 |
| 2003/0087628 | A1 * | 5/2003 | Michibata | 455/404 |
| 2003/0107529 | A1 * | 6/2003 | Hayhurst et al. | 345/1.1 |
| 2003/0153337 | A1 | 8/2003 | Ito | |

FOREIGN PATENT DOCUMENTS

| | | |
|---|---|---|
| JP | 10-65727 | 3/1998 |
| JP | 11-56932 | 3/1999 |
| JP | 11-70086 | 3/1999 |
| JP | 11-353576 | 12/1999 |
| JP | 2000-232533 | 8/2000 |
| JP | 2001-8265 A | 1/2001 |
| JP | 2001-14592 | 1/2001 |
| JP | 2001-127914 | 5/2001 |
| JP | 2001-202437 | 7/2001 |
| JP | 2001-211472 | 8/2001 |
| WO | WO 01/19102 A1 | 3/2001 |

* cited by examiner

EMERGENCY NOTIFICATION SYSTEM AND EMERGENCY NOTIFICATION DEVICE

CROSS-REFERENCE TO RELATED PATENT APPLICATIONS

This application is a continuation of application Ser. No. 10/238,628, filed Sep. 11, 2002, and based on Japanese Patent Application No. 2001-275876, filed Sep. 12, 2001, by Junichi Yamazaki and Masaaki Kawabata. This application claims only subject matter disclosed in the parent application and therefore presents no new matter.

BACKGROUND OF THE INVENTION

1. Field of the Invention

The present invention relates generally to an emergency notification system and an emergency notification device. More particularly, the invention relates to an emergency notification system and an emergency notification device to be employed therein, which can perform processes from registration to the emergency notification system to transmission of emergency notice without using voice.

2. Description of the Related Art

In the recent years, owing to the spread of the cellular telephone, it is possible to send emergency notifications of fire, calls for ambulance and so forth immediately on site. However, it frequently happens that one does not know the site of the emergency and it takes a relatively long period to go into action. On the other hand, when a disabled person, such as person with impaired hearing, is subject to disaster a disaster and has to make an emergency notification, such person cannot provide information about the nature of the emergency and the his/her own position because of difficulty in using the normal telephone communication using voice. Concerning the emergency notification system, Japanese Unexamined Patent Publication No. 2001-8265 discloses a personal security system using a cellular telephone terminal with GPS (Global Positioning System). In the disclosed personal security system, the emergency notification system is connected to a preliminarily registered management center by depressing an emergency button and a position information measured by using GPS is displayed on the management center.

However, the foregoing personal security system is premised on the assumption that communication between the cellular telephone terminal and the management center is performed by using voice. Therefore, unless communication with voice is performed, after operation of emergency button, the kind of emergency cannot be identified. In this point, the disclosed system cannot be said to be adapted for use by a disabled person subject to a disaster. On the other hand, the conventional emergency notification system employs a dedicated terminal. Such an emergency notification system cannot be said to be easily used because of high cost to purchase and the necessity of carrying the dedicated terminal only for emergency notification.

SUMMARY OF THE INVENTION

An object of the present invention is to provide an emergency notification system which can perform emergency notification by using a normal cellular telephone terminal instead of a dedicated terminal without requiring communication using a voice.

In order to accomplish the above-mentioned objects, an emergency notification system, according to the present invention, comprises:

a mobile communication network including a cellular telephone terminal;

an emergency notification device for receiving an emergency notification;

a communication line connecting the mobile communication network and the emergency notification device;

the cellular telephone terminal including display means for displaying a menu for identifying kind of emergency notification on a display screen and means for performing the emergency notification in response to selection of one of items in the menu by a user.

The emergency notification system according to the present invention displays a menu for identifying kind of emergency notification on the display screen of the cellular telephone terminal to enable to easily notify the content of emergency happening even for nonperson of disaster.

On the other hand, the emergency notification system includes the emergency notification device connected with the mobile communication network including the cellular telephone terminal via the communication line. In the emergency notification device, when access is made from the cellular telephone terminal via the mobile communication network, the screen image for displaying the menu for identifying kind of the emergency notification on the display screen of the cellular telephone terminal is transmitted.

In the emergency notification device of the present invention, when access is made from the cellular telephone terminal. Therefore, by selecting one of items in the menu, kind of the emergency happening can be identified, nonperson of disaster can easily notify the content of the emergency happening.

In the preferred embodiment of the present invention, the emergency notification system and the emergency notification device may include means responsive to reception of emergency notification from the cellular telephone terminal through the mobile communication network for checking whether the cellular telephone terminal is registered in the emergency notification system.

By providing the emergency notification service for the registrant of this system, emergency notification business can be established. On the other hand, by making reference to the registered information, the user of the cellular telephone terminal can be identified to provide an appropriate service.

In the preferred construction, the cellular telephone terminal may include position measuring means, the emergency notification device may include means for demanding transmission of position information of the cellular telephone terminal upon receipt of the emergency notification from the cellular telephone terminal.

By identifying the position of the cellular telephone terminal, the information of the position can be dominant information upon emergency notification. On the other hand, the communicant may notify own position without requiring voice communication.

In the preferred construction, the cellular telephone terminal may include means for displaying a menu for selecting whether transmission of position information is permitted or not, on the screen of the cellular telephone terminal, in response to the demand for transmission of position information from the emergency notification device.

In case of the position information, it can be considered that the user does not want to notify the position in view point of privacy protection. Upon permitting transmission of the position information displayed on the cellular telephone terminal, the position information will not be transmitted when permission is not given.

In the preferred construction, the emergency notification device may include means for transmitting a reception information indicative of reception of the emergency notification from the cellular telephone terminal, and the cellular telephone terminal includes means for generating vibration in response to reception of the reception information.

In order to notify that the emergency notification is normally received, the function of generating vibration in the cellular telephone terminal is used. By this, the communicant can confirm that notification is received.

Preferably, the cellular telephone terminal may include a camera for transmitting image information to the emergency notification device.

By transmitting image using camera, it becomes possible to transmit information such as environmental information where the communicant is placed, presence or absence and/or degree of injury and so forth, to the emergency notification device.

In the preferred construction, the emergency notification device may include means responsive to the emergency notification from the cellular telephone for transmitting a message indicative of occurrence of received emergency notification to at least one telephone registered in relation to the cellular telephone terminal.

By transmitting the notification not only to the relevant office by also to the registered person having close connection or personal physician, more subtle treatment becomes possible.

In the preferred construction, the emergency notification device may include means responsive to the emergency notification calling ambulance from the cellular telephone terminal, for obtaining health data of registrant registered in relation to the cellular telephone terminal from a hospital.

By connecting the emergency notification device and a server in the hospital in on-line manner, point to keep in mind in view point of held can be seen at early timing from clinical history, medication history and so forth to permit appropriate treatment.

In the preferred construction, the emergency notification device includes a database storing a registration information including an ID number of the cellular telephone terminal and a personal information of registrant.

From the cellular telephone terminal, personal information of the registrant and the ID number of the cellular telephone terminal are transmitted to the emergency notification device through the mobile communication network.

It is also the preferred feature of the present invention that the cellular telephone terminal includes means for transmitting a personal information on the basis of screen information for registration received from the emergency notification device.

By transmitting the matters necessary for registration from the emergency notification device as character information, the person who desired to be registered, it can be done only by inputting necessary information according to the guidance on the screen image. Particularly, such system is friendly to nonperson in disaster.

It is further preferred that a channel connecting the mobile communication network and the emergency notification system is a dedicated line.

By constantly connecting the mobile communication network and the emergency notification device by dedicated line, quick response to emergency happening can be enabled.

It is also the preferred feature of the present invention that a screen information for displaying a menu for identifying kind of emergency disaster is transmitted from the emergency notification device.

Upon emergency notification, by selecting item in the menu transmitted from the emergency notification device, the communicant may easily notify the content of emergency happening.

According to the second aspect of the present invention, a broad area emergency notification system includes a plurality of emergency notification systems respectively connected to a plurality of mobile communication networks, each of the emergency notification systems comprising:

a mobile communication network including a cellular telephone terminal;

an emergency notification device for receiving an emergency notification;

a communication line connecting the mobile communication network and the emergency notification device;

the cellular telephone terminal including display means for displaying a menu for identifying kind of emergency notification on a display screen and means for performing the emergency notification in response to selection of one of items in the menu by a user, and the plurality of emergency notification systems being connected with each other through dedicated line.

By connecting a plurality of emergency notification systems through dedicated line, emergency notification service can be provided in boarder area. Similarly to the normal user of the mobile communication network who does not care difference of service area, the user of the emergency notification system may perform emergency notification with paying attention to difference of the service area.

According to the third aspect of the present invention, an emergency notification device connected to a mobile communication network including a cellular telephone terminal through a communication line, comprises:

means, responsive to access from the cellular telephone terminal via the mobile communication network, for transmitting an image information for displaying a menu for identification of kind of the emergency notification on a display device of the cellular telephone terminal.

The emergency notification device may further comprise means, responsive to reception of emergency notification from the cellular telephone terminal through the mobile communication network, for making judgment whether the cellular telephone terminal is registered in the emergency notification network. The emergency notification device may further comprises means, responsive to reception of the emergency notification from the cellular telephone terminal, for transmitting a message for announcing received emergency notification to at least one telephone registered in relation to the cellular telephone terminal.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiments of the emergency notification system according to the present invention with reference to the accompanying drawings. In the following description, numerous specific details are set forth in order to provide a thorough understanding of the present invention. It will be obvious, however, to those skilled in the art that the present invention may be practiced without these specific details.

It should be noted that while the following disclosure of the preferred embodiments of the present invention will be given under the premise that a user of the emergency notification system is a man with impaired hearing, application of the present invention is not limited to this.

First Embodiment

Figure 1:
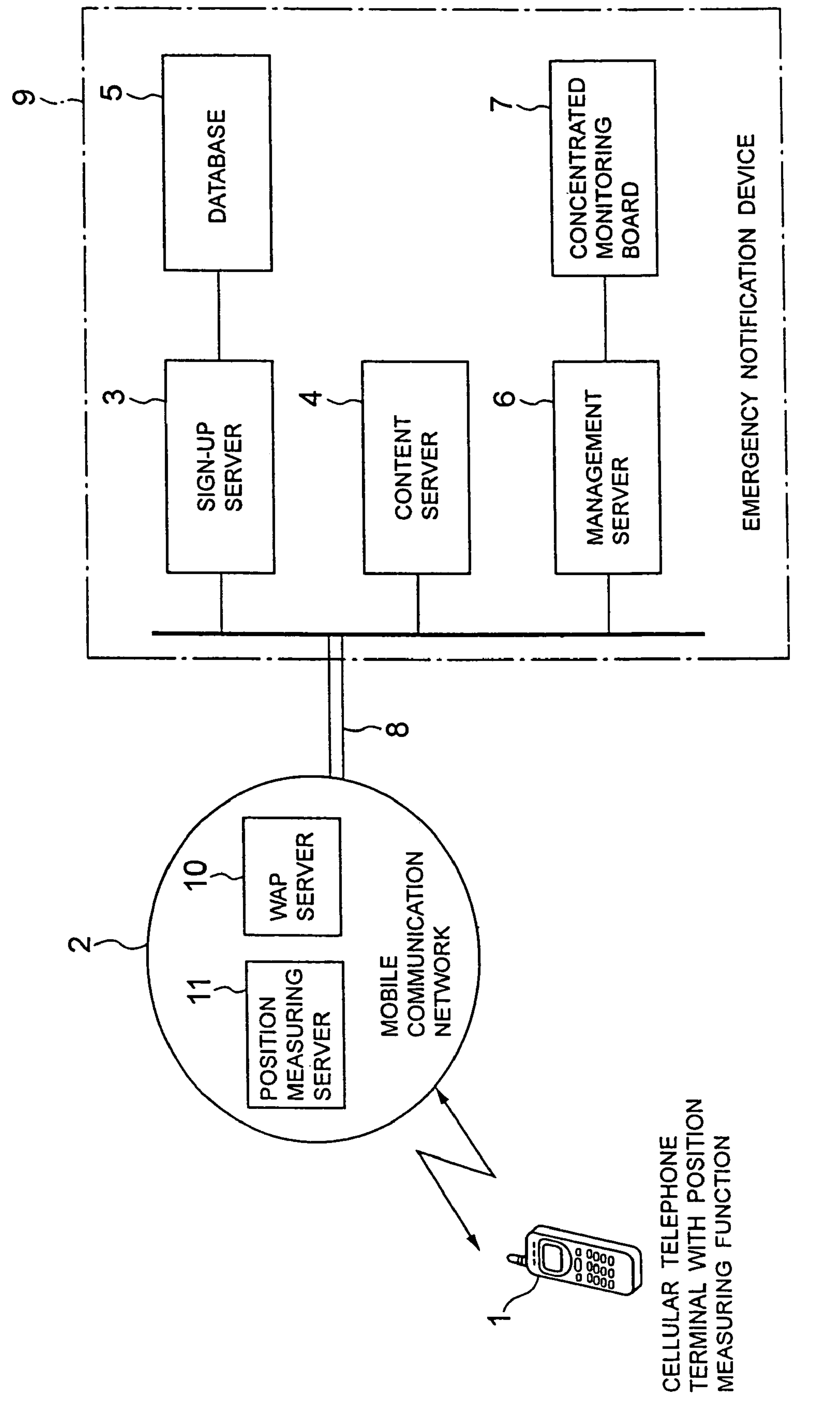
FIG. 1 is a block diagram showing an overall construction of the first embodiment of an emergency notification system according to the present invention.

FIG. 1 shows an overall construction of the first embodiment of an emergency notification system according to the present invention. The emergency notification system is constructed with a cellular telephone terminal 1 with a position measuring function (a positioning function), a mobile communication network 2 and an emergency notification device 9. A cellular phone terminal 1 is a portable terminal connected to a mobile communication network and has functions to drive a main body of the telephone terminal for generating vibration and to identify one's own position in addition to a capability of transmission and reception of data. The mobile communication network 2 has WAP (Wireless Application Protocol) server 10 and a position measuring server 11, and has a transmitting and receiving function for transmitting and receiving data with the cellular telephone terminal 1 and an auxiliary function for identifying position. The WAP server 10 has an interface function for displaying a content on the cellular telephone terminal 1. The position measuring server 11 has a function for identifying the position of the cellular telephone terminal 1.

The emergency notification device 9 is connected to the mobile communication network 2 via a dedicated line 8 and has a function for transmitting and receiving data with the cellular phone terminal 1. The emergency notification device 9 is constructed with a sign-up server 3, a content server 4, a database 5, a management server 6 and a concentrated monitoring board 7. The sign-up server 3 has a function for correcting personal information of the user using the cellular telephone terminal 1 and a personal authentication function. The database 5 has a function for reading out information from the sign-up server 3 and accumulating registered information including personal information of registrants and ID numbers of the telephone terminals. The content server 4 has a function for receiving a signal from the cellular telephone terminal 1 and transmitting browser information required for the cellular telephone terminal 1. The management server 6 has a function for accumulating personal information and position information and a function for transferring those information to the concentrated monitoring board 7. The management server 6 also has a function for relaying and transferring a signal from the concentrated monitoring board 7 to the content server 4.

Figure 2:
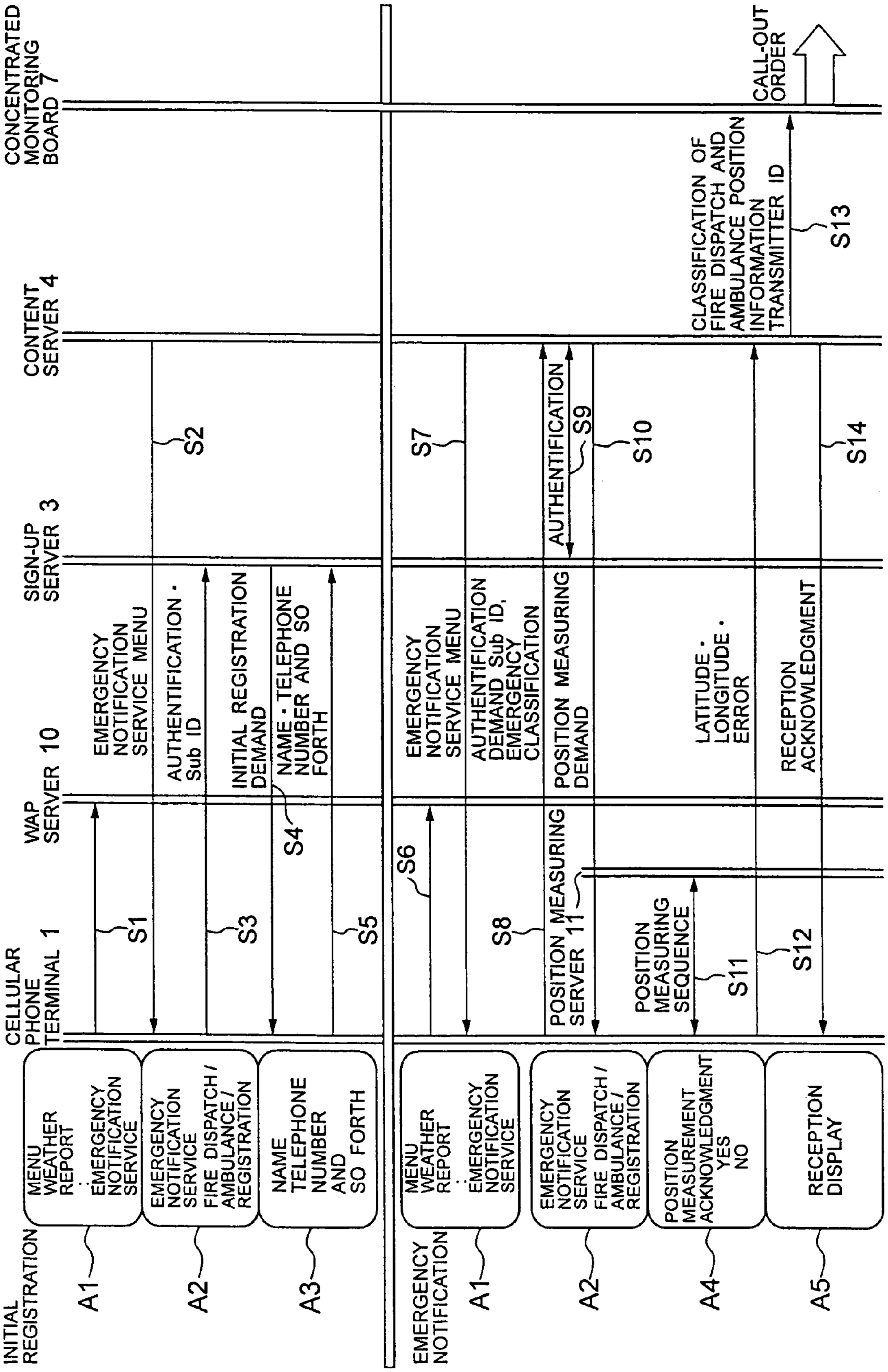
FIG. 2 is a flowchart in the emergency notification system of FIG. 1.

FIG. 2 is a flowchart showing exchange of signal in respective portions of the system shown in FIG. 1. A person who uses the emergency notification system is required to purchase the cellular telephone terminal with a position measuring function. The purchased cellular telephone terminal 1 can receive service of the emergency notification system by registration. Registration is required at once unless data is modified.

Flow of registering operation will be discussed with reference to FIG. 2. A person who desires to make registration, at first establishes connection with WAP server 10 from the cellular telephone terminal 1 (step S1) to open a menu screen A1. The menu screen image A1 is a main or united menu of services provided by the mobile communication network 2 and includes an item of emergency notification service in addition to weather report, news and so forth. When the item of emergency notification service is selected among the items in the menu screen A1, an emergency notification service menu screen image A2 is displayed (step S2). This screen image is a screen information transmitted from the WAP server 10 or the content server 4 and is constructed as a menu for selection of "fire dispatch/ambulance/registration". It should be noted that the emergency notification service menu screen image A2 may be stored in a storage device of the cellular telephone terminal as image information. If the image information of the emergency notification service menu screen image A2 once are stored in the storage device of the cellular telephone terminal, the emergency notification service menu screen image A2 can be opened without requiring transmission from the WAP server 10 and the content server 4. On the other hand, by shipping the cellular telephone terminal in a condition preliminarily storing the content of the emergency notification service menu screen image A2 in the storage device thereof, this screen image can be recalled without establishing connection with the WAP server 10.

When "Registration" is selected from the menu in the emergency notification service menu screen image A2, registration operation is initiated between the cellular telephone terminal 1 and the sign-up server 3. Then, from the cellular telephone terminal, an authentication demand for the emergency notification service, a Sub ID as ID information unique to the cellular telephone terminal 1 are transmitted to the sign-up server 3 (step S3). The sign-up server 3 transmits screen image information necessary for initial registration to the cellular telephone terminal 1 (step S4). When the screen image information is received, the cellular telephone terminal 1 displays a registration screen image A3. A person desiring registration inputs necessary information, such as name, telephone number and so forth according to guidance on the screen image, to transmit to the sign-up server (step S5). The information transmitted to the sign-up server 3 is directly accumulated in the database 5. On the side of the emergency notification device 9, since all of these series of operation is performed by the sign-up server 3, registration can be performed without requiring manual operation. After completion of the registration, the emergency notification system can be available by the cellular telephone terminal.

Next, as an example, a case where the user desires to perform emergency notification relating to occurrence of fire to a fire station, will be discussed. At the occurrence of happening requiring emergency notice, the user establishes connection with the WAP server 10 from the cellular telephone terminal 1 (step S6). Then, the user opens the menu screen image A1. Among items in the menu screen image A1, the screen notification service menu screen image A2 is recalled (step S7). When "Fire" is selected among items in the emergency notification service menu screen image A2, a packet signal containing the emergency notification reception demand, Sub ID and emergency classification, is transmitted to the content server 4 (step S8). The content server 4 issues the authentication demand based on transmitted Sub ID with the sign-up server 3. When authentication is completed, an individual information is identified.

The content server 4 transmits a position measurement demand to the cellular telephone terminal 1 (step S10). In the cellular telephone terminal 1, a position measurement verification screen image A4 for selecting whether position measurement is accept or not, is displayed. It should be noted that this screen image can be eliminated by setting. When "YES" is selected, position measurement of the user is initiated between the position measuring server 11 and the cellular telephone terminal 1 (step S11). In practice, GPS is used. The position measuring server 11 transmits information designating satellite available to the cellular telephone terminal, to the cellular telephone terminal 1. Utilizing the satellite designated by the information transmitted from the position measuring server 11, the cellular telephone terminal 1 derives latitude and longitude of own position to transmit to the position measuring server 11 as temporary position information. In the information of latitude and longitude, error can be contained. The position measuring server compares information transmitted from the cellular telephone terminal 1 on the basis of already known latitude and longitude of the own position and an orbit information of GPS for performing correction. The position measuring server 11 transmits information containing corrected latitude and longitude and error to the cellular telephone terminal 1. By this information, the position of the cellular telephone terminal 1 can be identified more accurately. The cellular telephone terminal 1 transmits the information containing latitude, longitude and error to the content server 4 (step S12).

The position information, personal information and information of emergency classification and so forth are transferred to the concentrated monitoring board 7 from the content server 4 (step S13), and displayed on a monitoring screen of the concentrated monitoring board 7. When reception of emergency notification is confirmed, the concentrated monitoring board 7 returns a reception signal to the content server 4. Upon confirmation of the reception signal, the content server 4 transmits a reception information to the cellar telephone terminal 1. The cellular telephone terminal 1 then notifies that the emergency notification is normally received, to the user by reception display A5 and vibration of the main body of the cellular telephone terminal (step S14). On the other hand, on the basis of the information on the display screen of the concentrated monitoring board 7, an operator calls out associated offices, for example, fire engine, ambulance and so forth.

In the shown embodiment of the emergency notification system according to the present invention, man of impaired hearing can perform emergency notification identifying a position and kind of emergency notification using only normal cellular telephone terminal without using a voice even when own position is not known at a visited place. On the other hand, using the message and vibration, reception verification is performed. Therefore, completion of the notification can be conformed.

Second Embodiment

Figure 3:
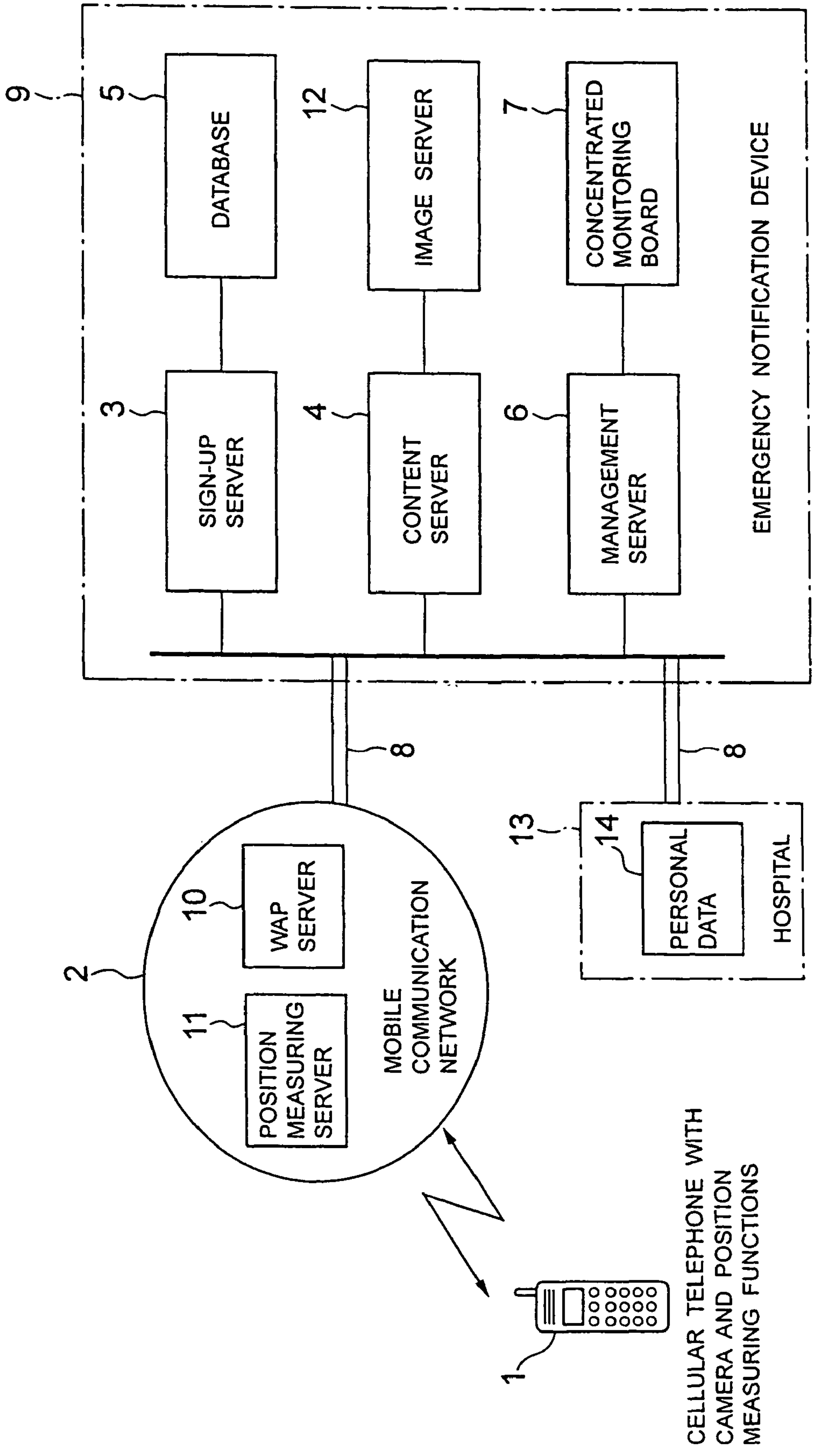
FIG. 3 is a block diagram showing an overall construction of the second embodiment of an emergency notification system according to the present invention.

FIG. 3 shows the overall construction of the second embodiment of the emergency notification system according to the present invention. The shown embodiment of the emergency notification system is differentiated from that of the first embodiment in that the cellular telephone terminal 1 is provided with a camera, an image server 12 is arranged in the emergency notification device 9, a hospital 13 is connected with the emergency notification device 9 through the dedicated line 8, and personal data 14 is stored in the hospital 13.

The cellular telephone terminal 1 has a function of feeding an image picked-up using the camera, a position measuring function, a data transmitting and receiving function and function providing vibration to the main body. The image server 12 arranged in the emergency notification device 9 has a function for receiving image from the cellular telephone terminal and image data management function. The emergency notification device 9 is connected to the hospital 13 via the dedicated line 8 and can receive the personal data 14 in the hospital.

Hereinafter, discussion will be given for the case where the user performs emergency notification. When the user registered in the emergency notification device 9 performs emergency notification using the cellular telephone terminal 1, peripheral information, accident information, fault information picked-up by the camera is accumulated in the image server 12 of the emergency notification device 9. Classification of fire dispatch or ambulance, Sub ID, position information and picked-up image information are transferred to the concentrated monitoring board 7. Upon notification calling ambulance, information of medical history of the communicant can be immediately corrected by retrieving personal data 14 in the hospital 13. As required, the image data from the cellular telephone terminal 1 is transmitted to the hospital 13 to permit early medication in remote by showing the image data to the doctor.

In the second embodiment, by utilizing the camera of the cellular telephone terminal 1, the emergency notification device 9 can be visually check environmental and peripheral condition where the communicant is placed, by the image. On the other hand, by establishing connection with the hospital 13 via the dedicated line 8, by making reference to personal data, such as medical history of the communicant, it can be used for emergency operation. By further transferring the image to the hospital 13, instruction from the hospital can be received.

Third Embodiment

Figure 4:
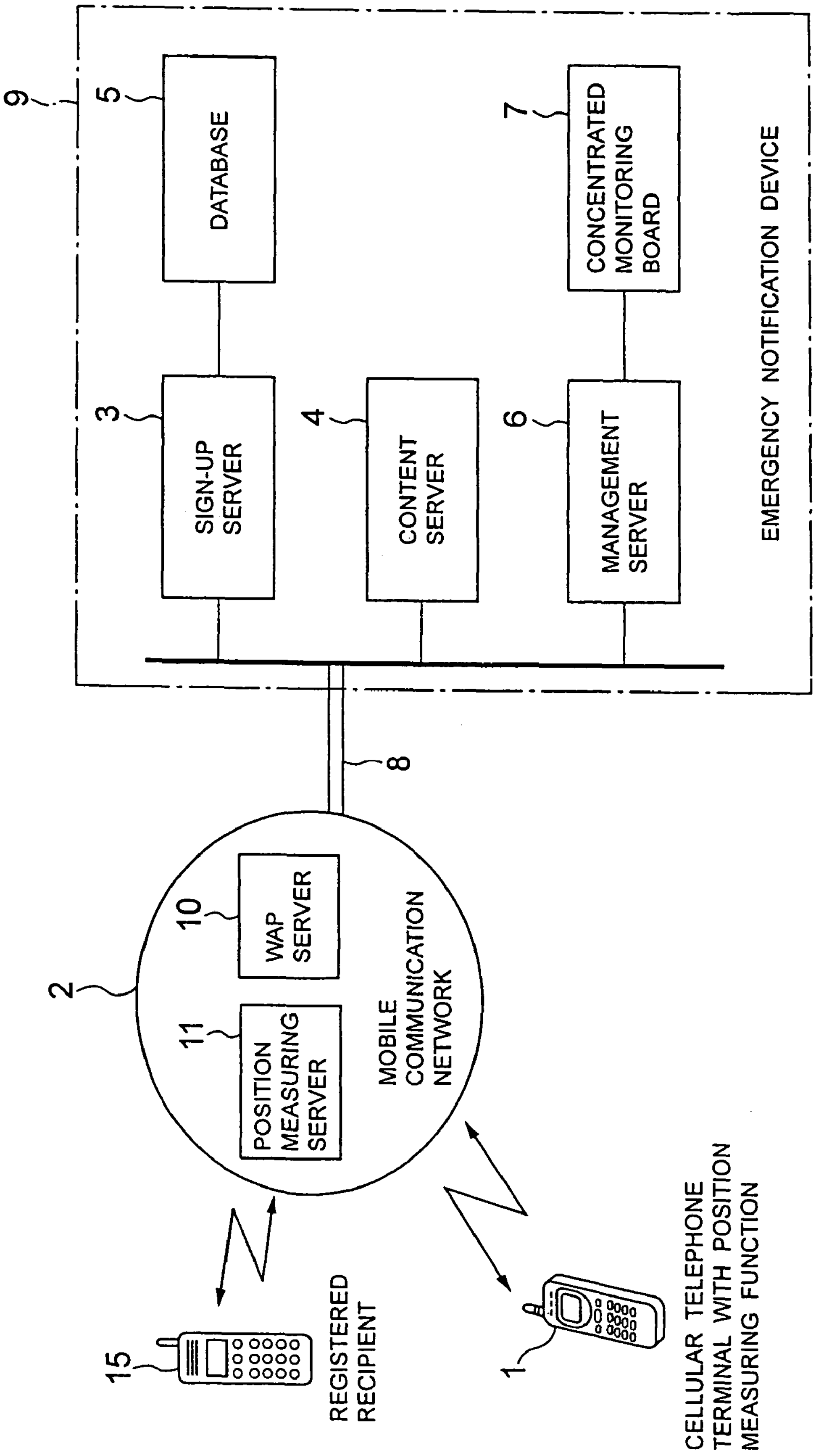
FIG. 4 is a block diagram showing an overall construction of the third embodiment of an emergency notification system according to the present invention.

FIG. 4 shows the overall construction of the third embodiment of the emergency notification system according to the present invention. The shown embodiment is constructed by adding function for notifying emergency notification to registered recipient 15 in addition to the construction of the emergency notification device in the first embodiment. It should be noted that the additional function may be added to the construction of the emergency notification device in the second embodiment. On the other hand, in FIG. 4, while the registered recipient 15 is the cellular telephone terminal of the mobile communication network 2, the recipient is not limited to the cellular telephone terminal as long as communication for emergency notification is possible.

The shown embodiment of the emergency notification system is differentiated from other embodiment in that the emergency notification device 9 performs automatic notice to the preliminarily registered recipient 15 when the user performs emergency notification. As the registered recipient 15, a personal physician, family person, rellie, care giver and so forth are considered. By preliminarily registering the recipient, simultaneously with emergency notification, notice can be given for a person having close connection with the communicant. Thus, more suitable service can be provided to the user.

Fourth Embodiment

Figure 5:
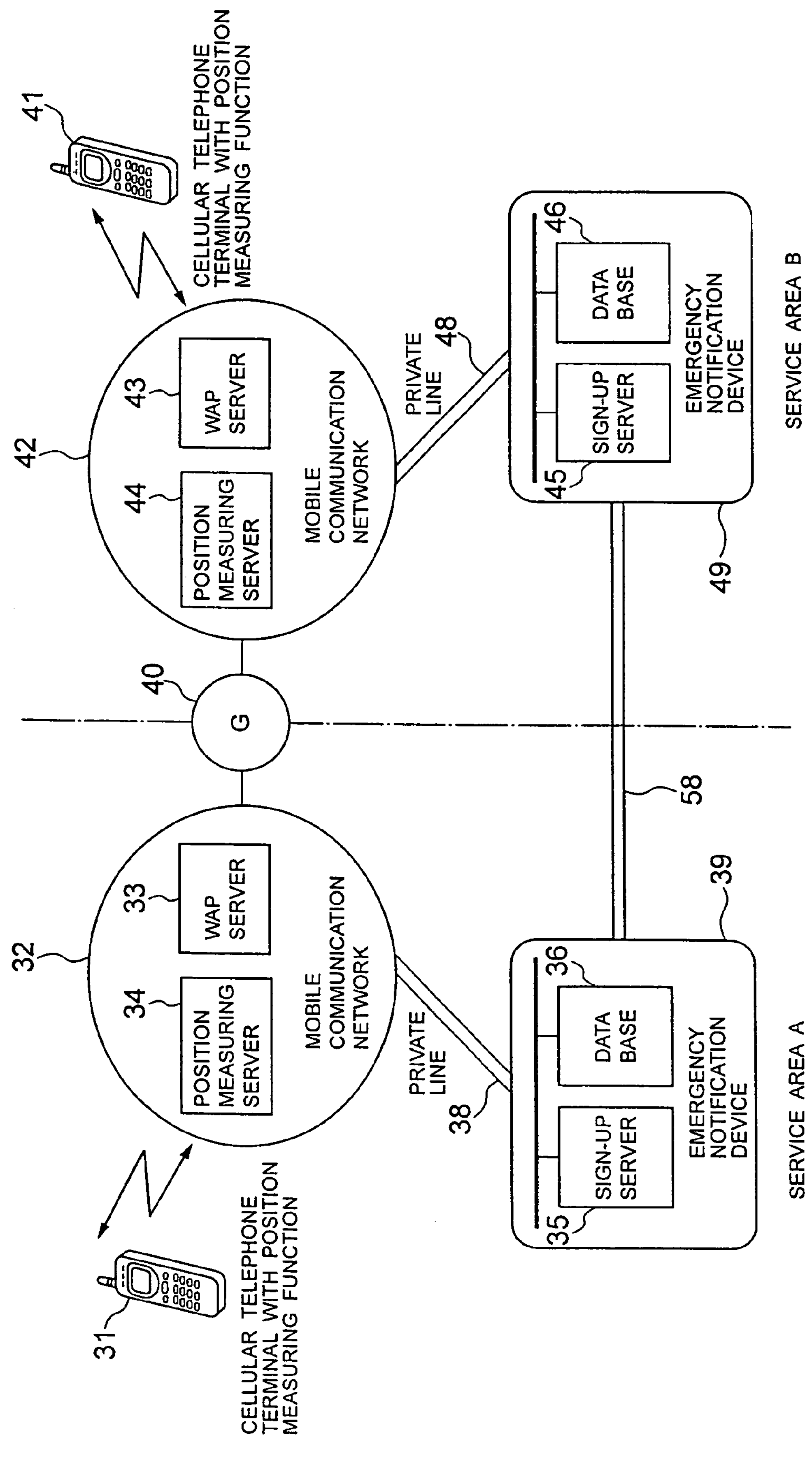
FIG. 5 is a block diagram showing an overall construction of the fourth embodiment of an emergency notification system according to the present invention.

FIG. 5 shows an overall construction of a wide area emergency notification system as the fourth embodiment of the emergency notification system according to the present invention. Mobile communication networks 32 and 42 connected with each other are respectively connected to emergency notification devices 39 and 49 for providing emergency notification services in respective service areas A and B, and for providing wide area service in both areas. These mobile communication networks 32 and 42 provide wide area services in the service areas A and B, respectively. The emergency notification devices 39 and 49 are connected with each other by a dedicated line 58. The mobile communication networks 32 and 42 have the same construction and function as any one of the mobile telecommunication network 2 of the first to third embodiments set forth above. On the other hand, the emergency notification devices 39 and 49 may have the same construction and function as any one of the emergency notification device 9 of the first to third embodiments set forth above. In FIG. 5, a part of internal construction of the emergency notification device is eliminated from illustration. Databases 36 and 46 store tables storing Sub ID and registered area in connection with the registrants registered in all of service areas. The service areas A and B may be separate areas, for example. However, it may be possible that the areas are set in partly overlapping manner.

The mobile communication networks 32 and 42 having different service areas are connected to a gateway 40. Using this gateway 40, the user of the mobile communication network 32 of the service area A may receive service in the mobile communication network 42 in the service area B. The users of the cellular telephone terminals 31 and 41 may communicate either in the service areas A and B. Namely, the user may use the cellular telephone terminal without considering, to which of the mobile communication networks, the own terminal is communicating.

Discussion will be given for an example where user of the emergency notification system using the mobile communication network 32 of the service area A and registered in the emergency notification device 39, are present. The user using the emergency notification system in the mobile communication network 32 purchases the cellular telephone terminal 21 with position measuring function and makes initial registration. This initial registration is completed by receiving personal information in the sign-up server 35 of the emergency notification device 39 connected to the mobile communication network 32 through the private network 38 and registering the personal information to the database 36. When the user desire to perform emergency notification to a fire station in the service area A, similarly to the examples of the first to third embodiments, the emergency notification device 39 receives the emergency notification to take necessary action. The personal information of the user is stored in the database 36. Thus, personal information necessary for authentication or so forth is read out from the database 36.

It is assumed that the user in possession of the cellular telephone terminal 31 moves from the service area A to the service area B. While the service area A and the service area B are constructed with different mobile communication networks, the user may use the normal cellular telephone terminal 31 through the mobile communication network 42 without requiring user's attention by operation of the gateway 40. When emergency notification is made using the cellular telephone terminal 31 from the service area B, the authentication demand is transmitted to the sign-up server 45 through the mobile communication network 42. The sign-up server 45 makes reference to a relationship between the Sub ID and the registered area of the registrant registered in all of service areas stored in the database, to recognize that the user in possession of the cellular telephone terminal 31 is registered in the service area A.

When recognition is made that the information of the user is registered in the service area A, the emergency notification device 49 inquires information of the user for the emergency notification device 39 in the service area A connected through the dedicated line 58. The information of the user using the cellular telephone 31 is copied from the personal information in the database 36 in the emergency notification device 39 of the service area A. The copied personal information is temporarily accumulated in the database 46. Then, on the basis of the copied personal information, authentication is performed. Then, the user may receive service similar to that can receive in the service area A where the user is registered, even in the service area B. In this period, the user does not pay any attention for difference of the service area and is not required any special operation.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

For instance, the emergency notification system and the emergency notification device according to the present invention is not particularly applicable for calling fire engine and ambulance but can be applicable for emergency notification for other purpose. Furthermore, it is possible to transmit screen image information requiring information of degree of injury, presence or absence of external injury to the cellular telephone terminal for collecting more information.

As set forth above, the emergency notification system and emergency notification device can perform emergency notification using only normal cellular telephone terminal and without speaking in voice.

What is claimed is:

1. An emergency notification device, comprising:

an interface;

a database; and a display, wherein the interface is configured to receive an emergency notification including position information of a mobile terminal obtained by position measuring means, image information, and emergency classification information from the mobile terminal and display information on the display based on the position information and emergency classification information, wherein the emergency classification information comprises a particular emergency dispatch request, wherein the database is configured to store registration information for the mobile terminal and for a second mobile terminal, wherein the emergency notification device is configured to provide an automatic notice to the second mobile terminal upon receiving the emergency notification from the mobile terminal, and wherein the emergency notification device is further configured to receive an ID and authenticate the ID;

wherein the emergency notification device is further configured to transmit the image information to a hospital to permit early diagnosis;

wherein the emergency notification device is further configured to receive instructions from the hospital in response to the image information transmitted to the hospital.

2. The emergency notification device as set forth in claim 1, wherein the particular emergency dispatch request is one of an ambulance dispatch request and fire dispatch request.

3. The emergency notification device as set forth in claim 1, wherein the emergency notification device is further configured to obtain and display information of a person corresponding to the ID.

4. The emergency notification device as set forth in claim 1, wherein the emergency notification device is further configured to transmit one or more inquiries for further information to the mobile terminal.

5. The emergency notification device as set forth in claim 4, wherein the emergency notification device is further configured to receive a response for the inquiries and display information based on the response.

6. The emergency notification device as set forth in claim 1, wherein the interface is further configured to receive modified position information from the mobile terminal, which is obtained by modifying the position information at the mobile terminal, and wherein the emergency notification device is further configured to display information based on the modified position information.

7. A mobile terminal, comprising:

a display;

an interface; and a camera, wherein the mobile terminal is configured to transmit an emergency notification including position information of the mobile terminal obtained by position measuring means, image information obtained from the camera associated with the mobile terminal, and emergency classification information, wherein the mobile terminal is configured to display, via the display, a menu screen image comprising a plurality of emergency dispatch requests, wherein the mobile terminal is further configured to derive latitude and longitude of its own position and transmit the latitude and longitude to a position measuring server of an emergency notification device, and wherein the mobile terminal is further configured to transmit error information with the derived latitude and longitude, wherein the mobile terminal is further configured to transmit an ID to an emergency notification device, and wherein the mobile terminal is further configured to transmit modified position information which is obtained by modifying the position information at the mobile terminal.

8. The mobile terminal as set forth in claim 7, wherein the image information comprises one of peripheral information, accident information, and fault information.

9. The mobile terminal as set forth in claim 7, wherein the plurality of emergency dispatch requests comprise an ambulance dispatch request and a fire dispatch request.

10. The mobile terminal as set forth in claim 7, which receives a reception signal after transmitting the emergency notification and then, vibrates.

11. An emergency notification system, comprising:

a mobile terminal configured to transmit an emergency notification including position information of the mobile terminal obtained by position measuring means, image information obtained from a camera associated with the mobile terminal, and emergency classification information, wherein the mobile terminal is configured to display a menu screen image comprising a plurality of emergency dispatch requests;

an emergency notification device configured to receive the emergency notification including the position information, the image information, and the emergency classification information from the mobile terminal and display information based on the position information and emergency classification information;

wherein the emergency notification device is configured to transmit a reception acknowledgment to the mobile terminal and the mobile terminal is configured to vibrate in response to reception of the reception acknowledgment signal; and a second mobile terminal configured to receive an automatic notice from the emergency notification device, wherein the second mobile terminal is preliminarily registered with the emergency notification device, wherein the mobile terminal is further configured to transmit an ID to the emergency notification device and, upon reception of the ID, the emergency notification device is configured to authenticate the ID, and wherein the emergency notification device authenticates the ID by determining whether or not the ID is registered in the emergency notification system, and wherein the mobile terminal is further configured to transmit modified position information which is obtained by modifying the position information obtained by the position measuring means, and the emergency notification device is further configured to receive the modified position information and display information based on the modified position information.

12. The emergency notification system as set forth in claim 11, wherein the second mobile terminal is associated with one of a physician, family member, friend, and care giver.

13. The emergency notification system as set forth in claim 11, wherein the emergency notification device is further configured to transmit the image information to a hospital to permit early diagnosis.

14. The emergency notification device system as set forth in claim 13, wherein the emergency notification device is further configured to receive instructions from the hospital in response to the image information transmitted to the hospital.

15. The emergency notification system as set forth in claim 11, wherein the image information comprises one of peripheral information, accident information, and fault information.

16. The emergency notification system as set forth in claim 11, wherein the plurality of emergency dispatch requests comprise an ambulance dispatch request and a fire dispatch request.

17. The emergency notification system as set forth in claim 11, wherein the emergency notification device is further con figured to obtain and display personal information of a person corresponding to the ID.

18. The emergency notification system as set forth in claim 11, wherein the emergency notification device is configured to transmit one or more inquiries for further information to the mobile terminal.

19. The emergency notification system as set forth in claim 18, wherein the emergency notification device is configured to receive a response for the inquiries and display information based on the response.

* * * * *